Figure 1:
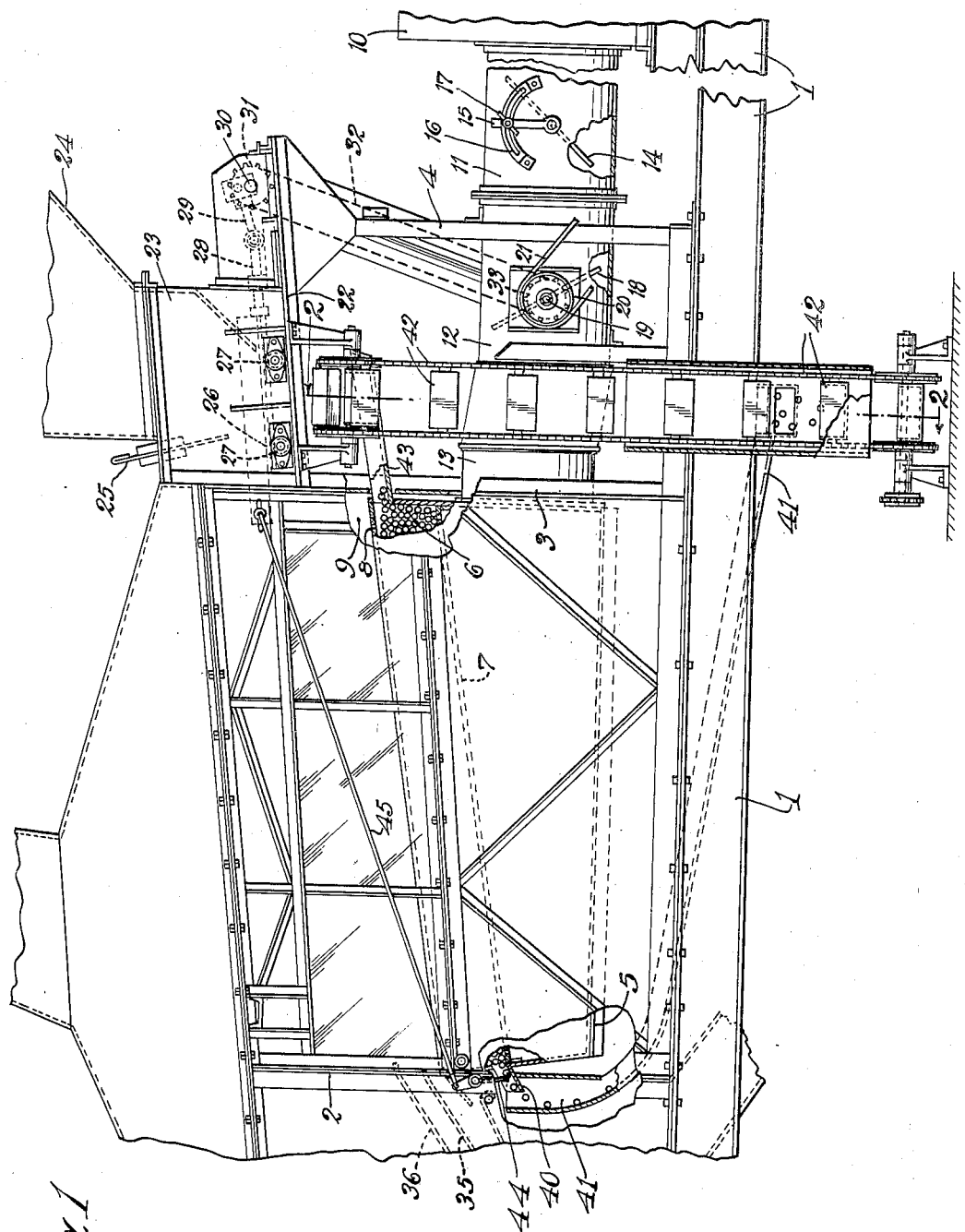

April 18, 1939.  E. STUMP  2,154,784

RESISTANCE PACK FOR GRAVITY SEPARATORS AND THE LIKE

Filed Sept. 22, 1937  3 Sheets-Sheet 1

Inventor
Earl Stump
Parker Carter
Attorneys

April 18, 1939. E. STUMP 2,154,784
RESISTANCE PACK FOR GRAVITY SEPARATORS AND THE LIKE
Filed Sept. 22, 1937 3 Sheets-Sheet 2
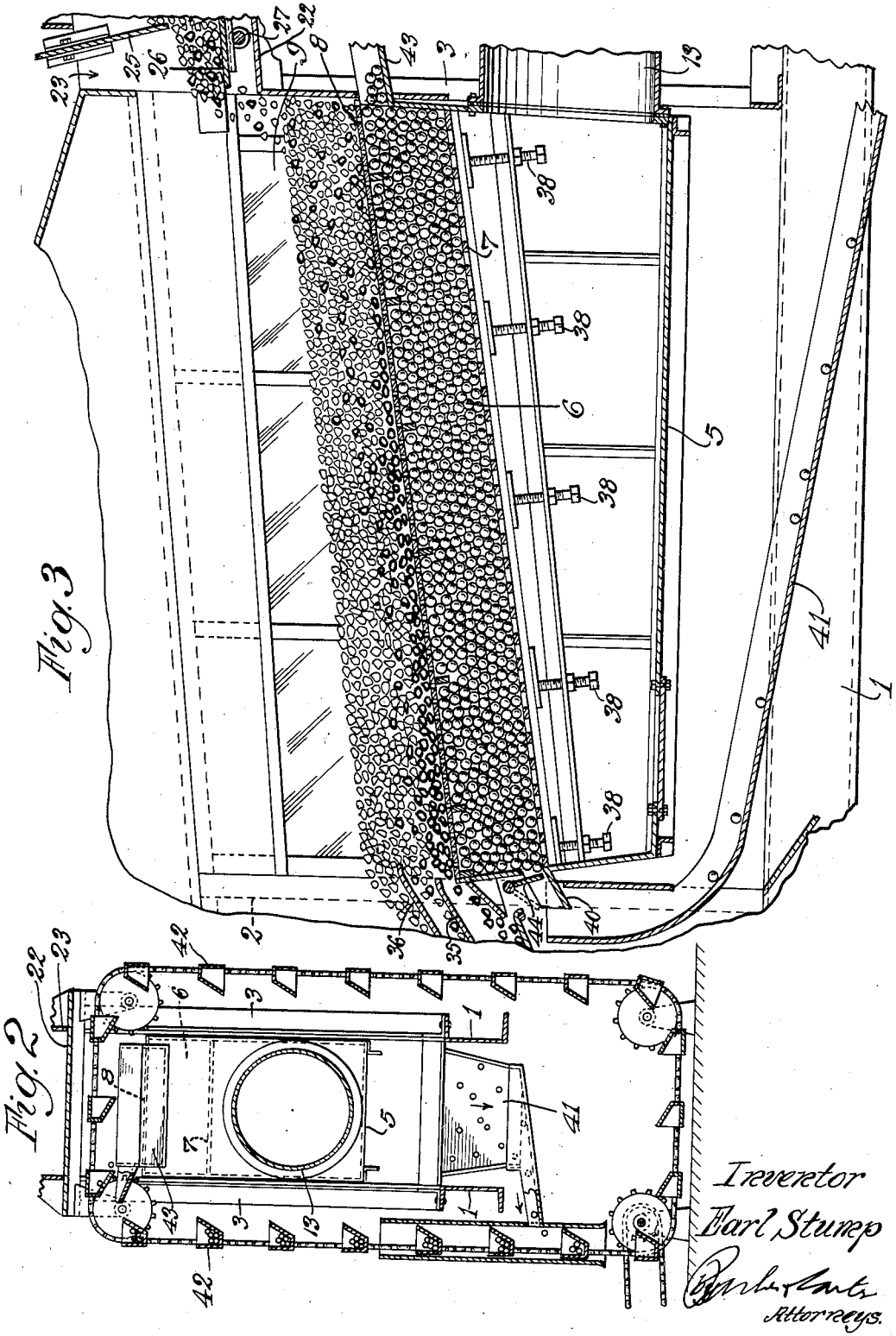

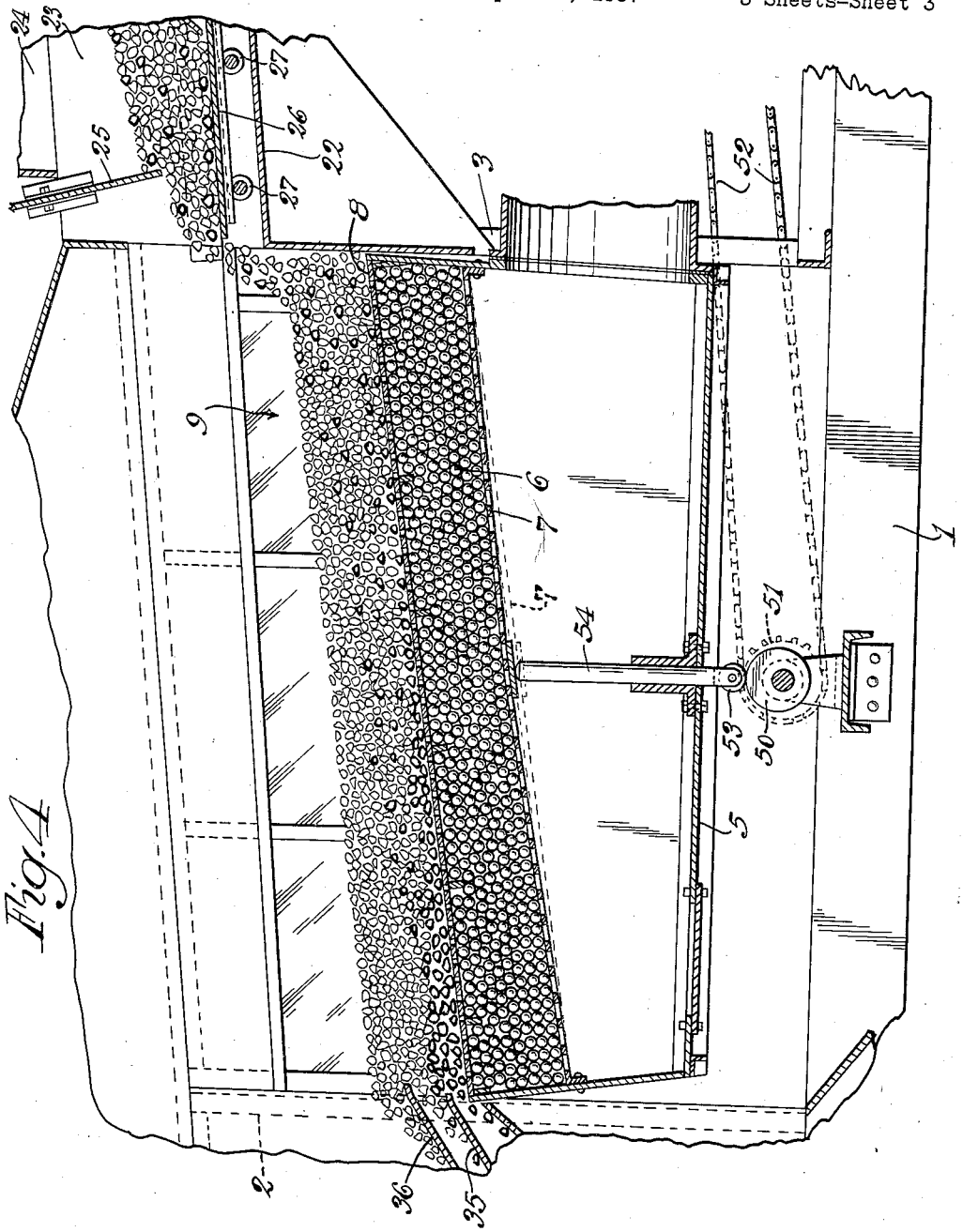

Patented Apr. 18, 1939

2,154,784

UNITED STATES PATENT OFFICE 2,154,784

RESISTANCE PACK FOR GRAVITY SEPARATORS AND THE LIKE

Earl Stump, Chicago, Ill., assignor to Roberts and Schaefer Company, Chicago, Ill., a corporation of Illinois Application September 22, 1937, Serial No. 165,128

12 Claims. (Cl. 209—486)

My invention relates to improvements in resistance packs for air cleaning machines for coal and the like and has for one object to provide a new and improved form of resistance pack which provides a high internal air resistance for a cleaning table or trough and wherein there is a minimum of danger of clogging and obstruction by dust, dirt and the like.

It will be understood that my invention is applicable to devices of the general type and character shown in my co-pending application Serial No. 733,053, filed June 2, 1934, wherein it is desired to provide a bed which will furnish a high internal resistance to the flow of the air under pressure so that the resistance offered by the bed to air flow is proportionately much larger than the resistance of the coal being treated.

Such a high resistance can, of course, easily be obtained by the use of a multiplicity of layers of screen or blanket cloth, canvas, or other porous material such as carborundum and the like. The difficulty with all these devices is that they tend to clog up. They clog from the top, they clog from the bottom. Unless the air forced upwardly through the resistance bed is absolutely clean, the bed serves as a dust filter to filter out the dust from the air and such dust soon clogs the interstices or narrow channels and the device becomes inoperative.

On the other hand, the bed also clogs from above because whenever the air current is turned off, the dust tends to drop down toward and into the resistance bed and may not all be blown out when the machine is started up again. The continual stopping and starting incident to stopping and starting the plant ultimately results in clogging the bed from the top and so if the usual type of resistance bed is used it becomes necessary to stop the plant and take the machine down and clean it sometimes as much as two or three times a day.

Devices of this kind even before they clog to the point of becoming inoperative show a rapid decrease in effectiveness because as the clogging proceeds, it is not uniform and one finds part of the bed where the air current is free and other parts where it is reduced and operation is interfered with.

I propose to use a marble pack. It comprises a box perforated at top and bottom and filled with marbles or marble-like objects. Under some circumstances perhaps washed and sized gravel could be used, metal shot is too heavy. Under some circumstances hollow glass balls may be used but they are a little too fragile for ordinary use. The marbles I propose to use are the ordinary marbles of childhood except they do not have to be painted or colored. These marbles are generally of about the same size. They are generally spherical but as I obtain them commercially, they are seldom exactly uniform and seldom exactly spherical. These marbles are packed in this box with perforate top and bottom, the perforations being, of course, smaller than the marbles so that they will not escape. In the preferred form of my invention, means are provided to exert a pressure on one or other of the opposed sides of the marble box so as to set up an initial compacting pressure on the marbles, the pressure being just sufficient to keep them from rattling around loosely in the box. When the device goes into operation, the air blast passes from the air box up through the marbles and through the stream or sheet of coal on the floor of the trough and then out. Because this air blast is a pulsating blast, we find that the variation in pressure which may be as much as ten to twenty pounds to the square foot is sufficient to cause a breathing of the marble pack and this breathing of the marble pack results in causing the marbles to roam about enough to prevent clogging. If a bridge of dust starts somewhere, before it builds up enough to make any difference there will be sufficient movement of the marbles to break the bridge down and thus no clogging takes place.

Another difference between this device and the conventional fabric resistance is that the passages or interstices between the marbles are generally smooth sided and relatively large, much larger than any particle that is liable to get into the system. The resistance is obtained not by throttling through a small opening or through a multiplicity of openings as is the case with the fabric resistance but is obtained by the tortuous passages of relatively considerable length through which the air must travel and these passages are so interlocked and interrelated that the pulsating air blast sets up eddy currents in them and these eddy currents assist in building up the necessary resistance.

I propose and have illustrated in addition the use of means for positively causing a circulation of the marbles. Under ordinary circumstances, this is not necessary but there are circumstances occasionally where it is highly desirable and in this case there is, of course, a positive interchange of marbles superposed on the breathing effect which insures that bridging and clogging will be prevented and which also makes it possible to clean the marbles separately if and when that is desirable.

In a further modification, ordinarily not needed but sometimes very important, I propose to positively and mechanically expand and contract the marble box. This will supplement the breathing effect resultant from the pulsating stream of air, and of course in the event that work is being done with a continuously flowing rather than a pulsating air stream one or other of the latter two mentioned modifications becomes very important.

My invention is illustrated more or less diagrammatically in the accompanying drawings, wherein—

Figure 1 is a side elevation in part section;
Figure 2 is a section along the line 2—2 of Figure 1;
Figure 3 is a longitudinal section;
Figure 4 is a longitudinal section through a modified form.

Like parts are indicated by like characters throughout the specification and drawings.

1 is a horizontal supporting frame. Projecting upwardly from it, are columns 2, 3 and 4. Supported on the columns 2 and 3 is an air box 5 bounded at its top by a marble pack 6. The lower part of the marble pack comprises a perforate plate 7, the upper part a perforate plate 8, which latter plate serves as the floor of a trough 9, supported on the columns 2, 3 in which coal to be treated is received and through which it travels. 10 is a blower. It discharges air through the manually adjusted valve housing 11, the flutter valve housing 12, the pipe 13 into the air box. The valve 14 with handle 15, quadrant 16, and thumb nut 17 is used to manually adjust the air flow. The flutter valve or butterfly valve 18 is mounted on shaft 19 driven by pulley 20 and belt 21 preferably from the same source of power as the blower, and periodically opens and closes the air passage, and thereby causes a pulsating air flow.

22 is a feeder platform mounted on the columns 3 and 4. It carries a feeder box 23 supplied with coal from a hopper 24. 25 is a hand control valve to adjust the rate of flow. 26 is a reciprocating feeder plate traveling on rollers 27 and reciprocated by the push rod 28, connecting rod 29, crank shaft 30 driven by sprocket 31, sprocket chain 32 and sprocket 33 in unison with the flutter valve. The coal from the hopper is fed out by the reciprocating plate onto the floor of the feed chute. The pulsating effect of the current causes sufficient vibration and agitation of the coal so that it flows as a liquid stream down along the trough, the heavier particles gravitating to the bottom, the lighter particles gravitating to the top.

35 is a middlings chute, 36 a coal chute. The refuse goes out below the middlings chute, the middlings goes out along the middlings chute and the pure coal is discharged along the coal chute, coal, refuse and middlings being conveyed by any means not shown where they are to be used, stored or retreated.

Contained within the marble pack between the walls 7 and 8 is a mass of marbles or similar material. Screws 38 are provided to exert an initial pressure upon the bottom plate 7 so as to compact the marbles to prevent them rattling about loosely. These screws are located adjacent the edges of the plate 7, leaving the central portion of the plate free to breathe under the pulsating influence of the air current. The apertures through the plates 7, 8 are, of course, smaller than the marbles. As pressure builds up and then goes down on the lower marble supported plate, there will be a tendency for it to move up and down and it is this tendency which permits necessary movement of the marbles to prevent clogging.

Under some circumstances, it is desirable to have positive circulation of the marbles. This is accomplished by a chute 40 at the lower extremity of the marble pack, discharging into a passage 41, marbles traveling by gravity into a bucket conveyor 42 where they are raised to discharge into a chute 43 and then fed into the pack at the top. If desired, a valve 44 may be provided to control the rate of flow of marbles from the pack and that valve may be at rest or may be reciprocated by a connecting rod 45 or any other suitable means driven from the feeder plate.

In a further modified form, shown in Fig. 4, 50 is a cam driven by a sprocket 51, sprocket chain 52, from the fan motor. This cam is engaged by cam roller 53 and drives a push rod 54 to engage the underside of the plate 7 so that as the cam rotates, the plate is positively moved to expand and contract the marble pack and so assist in setting up the weaving, breathing, roaming effect of the marbles and pack.

The apertures in the plate 8, besides being smaller than the marbles, are also smaller than the minimum size of coal particle which it is desired to treat on the table or trough so that the coal cannot pass downwardly into the marble pack, but the apertures are larger than the air passages between and about the adjacent marbles and also larger than the dust particles which are always present when dust is being treated. The velocities through the tortuous passages between the marbles are relatively low, though of course higher than the air velocity above the deck becauses the resistance is obtained not by increasing the air velocities but by the long tortuous smooth walled passages defined by the marble pack. Dust is therefore free to pass down through the pack in a direction opposite to the direction of flow of the air. Such dust may under some circumstances travel downwardly against the air flow. In any event when the air is turned off the dust is free to move by gravity downwardly through the pack and because the marbles are smooth and rounded and because there are no sharp corners in the passages between and about the marbles there is no obstruction to such flow.

Experience shows that there is frequently a considerable deposit of dust on the bottom of the air chamber and such deposit does not interfere in any way with the operation of the device. It is only necessary to occasionally clean out such dust deposit.

I have illustrated my invention in connection with an apparatus designed primarily for the treatment of coal and I have refered to "coal" in specification and claims. It will be understood of course that coal is referred to merely illustratively and that my apparatus and the methods carried out thereby are equally applicable to the treatment of all kinds of solids in a broken or comminuted state which may be gravitally separated.

It will be understood, of course, that a very slight movement of the marbles is sufficient to prevent bridging and maintain passages clear, that relatively low power is available to cause this movement or roaming or breathing and that wherever this power is applied at any point within the pack it will make itself felt throughout the whole pack and so it is highly desirable, perhaps sometimes absolutely essential, that the pack be so arranged and the marbles so disposed that they are free to move with respect to one another throughout the entire area of the pack or box. That being the case, it becomes highly important that but a single marble pack be used for the floor of the entire trough or deck upon which treatment takes place because if that is the case, variations in pressure or pulsations applied anywhere within the pack will automatically make themselves be felt throughout the whole volume of the pack.

I claim:

1. A resistance bed for air separators and the like comprising a box apertured at top and bottom, a mass of marble like objects contained therein, means for exerting an initial pressure on the marbles sufficient to prevent looseness, and means for causing periodic expansion and contraction of the pack to provide a limited movement of the marbles with respect to one another, said means comprising a mechanically operated member adapted to engage one wall of the pack, and means for reciprocating said member to expand and contract the pack.

2. A resistance bed for air separators and the like comprising a box apertured at top and bottom, a mass of marble like objects contained therein, means for exerting an initial pressure on the marbles sufficient to prevent looseness, means for causing periodic expansion and contraction of the pack to provide a limited movement of the marbles with respect to one another, and means for continuously circulating marbles through the pack.

3. A resistance bed for air separators and the like comprising a box apertured at top and bottom, a mass of marble like objects contained therein, means for exerting an initial pressure on the marbles sufficient to prevent looseness, means for causing periodic expansion and contraction of the pack to provide a limited movement of the marbles with respect to one another, said means comprising an air box closed at one side by the marble pack, means for forcing air under pressure thereinto and means for imparting a pulsating effect to the air current, and means for continuously circulating marbles through the pack.

4. A resistance bed for air separators and the like comprising a box apertured at top and bottom, a mass of marble like objects contained therein, means for exerting an initial pressure on the marbles sufficient to prevent looseness, means for causing periodic expansion and contraction of the pack to provide a limited movement of the marbles with respect to one another, said means comprising a mechanically operated member adapted to engage one wall of the pack and means for reciprocating said member to expand and contract the pack, and means for continuously circulating marbles through the pack.

5. A resistance bed for air separators and the like comprising a box apertured at top and bottom, a mass of marble like objects contained therein, means for exerting an initial pressure on the marbles sufficient to prevent looseness, means for causing periodic expansion and contraction of the pack to provide a limited movement of the marbles with respect to one another, means for continuously circulating marbles through the pack, said means including an aperture through which marbles may be discharged at a low point in the pack and an aperture through which they may be received at a high point in the pack, and means for conveying marbles from the discharge to the receiving aperture.

6. A resistance bed for air separators and the like comprising a box apertured at top and bottom, a mass of marble like objects contained therein, means for exerting an initial pressure on the marbles sufficient to prevent looseness, means for causing periodic expansion and contraction of the pack to provide a limited movement of the marbles with respect to one another, said means comprising an air box closed at one side by the marble pack, means for forcing air under pressure thereinto and means for imparting a pulsating effect to the air current, means for continuously circulating marbles through the pack, said means including an aperture through which marbles may be discharged at a low point in the pack and an aperture through which they may be received at a high point in the pack, and means for conveying marbles from the discharge to the receiving aperture.

7. A resistance bed for air separators and the like comprising a box apertured at top and bottom, a mass of marble like objects contained therein, means for exerting an initial pressure on the marbles sufficient to prevent looseness, means for causing periodic expansion and contraction of the pack to provide a limited movement of the marbles with respect to one another, said means comprising a mechanically operated member adapted to engage one wall of the pack and means for reciprocating said member to expand and contract the pack, means for continuously circulating marbles through the pack, said means including an aperture through which marbles may be discharged at a low point in the pack and an aperture through which they may be received at a high point in the pack, and means for conveying marbles from the discharge to the receiving aperture.

8. In an air separator, a fixed resistance bed over which the material is passed, means for forcing air through said resistance bed to effect separation of the material, said resistance bed being composed of a packed mass of marbles or similar objects, and means independent of the air stream flowing through the bed for producing a relative movement between adjacent marbles in the bed to prevent clogging of the interstices between the said marbles.

9. In an air separator, a resistance bed comprising a mass of marbles or similar objects, means for passing material over said bed, means for forcing air through said bed to effect separation of the material, and means for causing a movement of marbles through said bed, said last means including means for withdrawing marbles from the bed at one point and means for adding marbles to the bed at another point.

10. In an air separator, two peforated plates supported in superimposed spaced relation and at an angle to the horizontal, a mass of small objects such as marbles or the like filling the space between said plates, means for causing a gradual flow of said objects through said space, means for delivering material to be separated to the uppermost plate, and means for forcing air through said plates to produce a flow of said material and stratification thereof in accordance with the difference in the specific gravities of its components.

11. In an air separator, a fixed resistance bed comprising a mass of marbles or similar objects, means for passing material over said bed, means for forcing air through said bed to effect separation of the material, mechanism for producing a relative movement between adjacent marbles in the bed to prevent clogging of the interstices between the said marbles, and means for periodically actuating said mechanism.

12. In an air separator, a resistance bed comprising a confined mass of small objects such as marbles or the like, means for forcing a pulsating current of air up through said bed, means for delivering material to the upper surface of said bed where it is stratified by action of the air current, means for periodically withdrawing a number of said objects from the said bed in timed relation to the pulsations in the air current, and means for supplying objects to said bed at a different point from the point at which they are withdrawn, whereby a gradual movement of objects in the bed is produced which tends to prevent clogging.

EARL STUMP.